Patented Dec. 1, 1942

2,303,337

UNITED STATES PATENT OFFICE 2,303,337

DERIVATIVES OF THE DIHALOGEN HYDROXY BENZOIC ACIDS AND PROCESS FOR THE MANUFACTURE OF THE SAME

Max Dohrn, Berlin-Charlottenburg, and Paul Diedrich, Finkenkrug, Osthavelland, Germany, assignors to Schering Corporation, Bloomfield, N. J., a corporation of New Jersey No Drawing. Application August 31, 1938, Serial No. 227,688. In Germany September 1, 1937

10 Claims. (Cl. 260—521)

This invention relates to derivatives of the dihalogen hydroxy benzoic acids and a process for the manufacture of the same.

In U. S. Patent No. 2,116,104 compounds are described which are derived from 3,5-diiodo-4-hydroxyacetophenons and are obtained by interaction of the sodium compound of 3,5-diiodo-4-hydroxyacetophenone, for example, with halogen alkyls, halogen hydroxy alkyls and halogen alkyl carboxylic acid esters. These compounds, which serve as intermediate products for the manufacture of X-ray contrast media, do not themselves possess the properties of a contrast medium since they are not sufficiently compatible and water-soluble.

In accordance with the present invention these compounds on replacement of the acteyl group by the carboxyl group acquire valuable properties if at the same time the OH-group is substituted by alkyl or aralkyl residues which still contain an OH- or COOH- or SO₃H-group or groups which are convertible thereinto as with the aid of hydrolysis. The new compounds correspond to the general formula

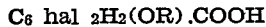

$$C_6 \text{ hal } _2H_2(OR).COOH$$

wherein hal indicates a halogen atom and R an alkyl residue containing a substituent selected from the group of ester or salt-forming substituents consisting of OH, COOH, SO₃H, and groups convertible thereinto with the aid of hydrolysis. Their salts with organic and inorganic bases are readily soluble in water and are distinguished by good compatibility and solubility and on account of great stability of the halogen atoms are excellently suited for application as X-ray contrast media.

For the manufacture of the said products the salts of the halogenated hydroxy benzoic acids or their esters may be caused to react with halogen alkyl carboxylic acid esters or halogen hydroxy alkyls, or with halogen aralkyl compounds and the products obtained if necessary, subsequently saponified.

It is also possible to employ other processes known per se for the manufacture of these compounds. Thus for example 3,4,5-trihalogen-benzoic acid esters may be reacted with alkali compounds of polyhydroxy or carboxy alkyl compounds.

The following examples illustrate the invention:

EXAMPLE 1.—*3,5-diiodo-1-carboxy-4-phenoxy acetic acid*

41.8 grams of 3,5-diiodo-4-hydroxy benzoic acid ethyl ester are dissolved in 100 ccs. of absolute ethyl alcohol, a solution of 2.3 grams of the ethyl ester of chloracetic acid introduced and the whole heated for a long time under reflux to boiling. On cooling of the solution there separates quantitatively the diester of 3,5-diiodo-1-carboxy-4-phenoxy acetic acid and it is obtained by recrystallisation from alcohol in colourless needles of melting point 97° C. The saponification of the ester with alcoholic caustic potash lye followed by acidification yields the 3,5-diiodo-1-carboxy-4-phenoxy acetic acid of melting point 265° C. The acid is soluble in alcohol, insoluble in water.

EXAMPLE 2.—*3,5-diiodo-4-β-hydroxyethoxy-1-benzoic acid*

44 grams of the sodium salt of 3,5-diiodo-4-hydroxy-benzoic acid ethyl ester are heated for 6 hours to 100° C. with 44 ccs. of freshly distilled ethylene chlorhydrin. The oily mass rendered turbid by separated common salt is stirred into ice water and the product which soon solidifies in crystals recrystallised from alcohol. The ester forms colourless needles of melting point 88–89° C. The free acid melts at 215° C.

EXAMPLE 3.—*3,5-diiodo-4-(β,γ-dihydroxy)-propyloxy-1-benzoic acid*

As described in Example 2, 44 grams of the sodium salt of 3,5-diiodo-4-hydroxy-benzoic acid ester are treated with 44 ccs. of α-chlorhydrin. The working up yields the ethyl ester of the 3,5-diiodo-4-(β,γ-dihydroxy)-propyloxy-benzoic acid in colourless needles of melting point 112–113° C. The free acid melts at 184° C.

EXAMPLE 4.—*3,5-diiodo-1-carbethoxy-4-phenoxy-carboxylic acid ester*

44 grams of the sodium salt of 3,5-diiodo-4-hydroxy-benzoic acid ester are suspended in 500 ccs. of benzene and with stirring a solution of 11 grams of chloro-carbonic acid ester in 50 ccs. of benzene added drop by drop.

After the introduction the whole is heated for a further hour on the water bath, then filtered hot and the filtrate concentrated. The oily residue solidifies on cooling in crystalline form and is recrystallised from alcohol. Colourless granules of melting point 115° C.

EXAMPLE 5.—*3,5-diiodo-1-carboxy-2-phenoxy-acetic acid*

The ester of the acid is obtained as described in Example 1 with the application of 3,5-diiodo-2-hydroxy-benzoic acid ester. The melting point of the di-ester is 105° C., that of the free acid 270° C.

Of course, many variations in the reaction conditions, the starting materials employed, the solvents used and the like may be made in accordance with the principles set forth herein and in the claims attached hereto.

What we claim is:

1. A process for the manufacture of derivatives of dihalogen-hydroxy benzoic acids comprising heating and reacting a 3,5-dihalogen-hydroxy-1-benzoic acid compound, the hydroxy group being in an ortho position to a halogen group, with an organic compound containing a group selected from the class consisting of halogeno-alkyl and halogeno-aralkyl groups containing a member of the class consisting of OH, COOH, SO$_3$H, and radicals convertible thereinto by hydrolysis, whereby said group is attached to the hydroxy oxygen of the dihalogen-hydroxy benzoic acid compound.

2. A process for the manufacture of derivatives of dihalogen-hydroxy benzoic acids comprising heating and reacting a compound selected from the group consisting of 3,5-diiodo-4-hydroxy-benzoic acids and salt and ester derivatives thereof with an organic compound containing a group selected from the class consisting of halogen alkyl and halogen aralkyl groups containing a salt-forming group taken from the class consisting of OH, COOH, SO$_3$H, and radicals convertible thereinto by hydrolysis.

3. Process for the manufacture of derivatives of a dihalogeno-hydroxy-benzoic acid, wherein a compound selected from the group consisting of salts and esters of 3,5-dihalogeno-hydroxy-1-benzoic acids, wherein the hydroxy group is in an ortho position to a halogen group, is heated and reacted with a halogenated compound taken from the class consisting of halogen alkyl and halogen aralkyl compounds containing a salt-forming substituent taken from the class consisting of OH, COOH, SO$_3$H, and groups convertible thereinto by hydrolysis.

4. Process for the manufacture of derivatives of a dihalogeno-hydroxy-benzoic acid, wherein a compound selected from the group consisting of the salts and esters of a dihalogeno-hydroxy-benzoic acid is heated and reacted with a chlorhydrin.

5. Process for the manufacture of derivatives of a dihalogeno-hydroxy-benzoic acid, wherein a compound selected from the group consisting of the salts and esters of a dihalogeno-hydroxy-benzoic acid is heated and reacted with an ethylene chlorhydrin.

6. Compounds selected from the group consisting of 3,5-dihalogen-1-benzoic acids of the formula C$_6$hal$_2$H$_2$(OR)COOH and esters and water-soluble salts thereof, wherein hal indicates a halogen atom, the OR group is in an ortho position to a halogen atom, and R is an alkyl residue containing a substituent selected from the group consisting of OH, COOH, SO$_3$H, and groups convertible thereinto by hydrolysis.

7. 3,5-diiodo-1-carboxy-4-phenoxyacetic acid having a melting point of 265° C. and being soluble in alcohol but insoluble in water.

8. 3,5-diiodo-4-$\beta$-hydroxyethoxy-1-benzoic acid having a melting point of 215° C., its ethyl ester melting at 88–89° C.

9. A process for the manufacture of hydroxy derivatives of a dihalogeno-hydroxy-benzoic acid comprising heating and reacting a compound selected from the group consisting of 3,5-diiodo-4-hydroxy-benzoic acids and salts and esters thereof with a chlorhydrin.

10. A process for the manufacture of hydroxy derivatives of a dihalogeno-hydroxy-benzoic acid comprising heating and reacting a compound selected from the group consisting of 3,5-diiodo-4-hydroxy-benzoic acids and salts and esters thereof with an ethylene chlorhydrin.

MAX DOHRN.
PAUL DIEDRICH.